(12) United States Patent
Koopman et al.

(10) Patent No.: US 8,757,231 B2
(45) Date of Patent: Jun. 24, 2014

(54) ELASTOMER TIRE SEALING RING

(75) Inventors: Hans Koopman, Waterloo (CA); Peter Gilbert, Collingwood (CA)

(73) Assignee: E. I. du Pont de Nemours and Company, Wilmington, DE (US)

( * ) Notice: Subject to any disclaimer, the term of this patent is extended or adjusted under 35 U.S.C. 154(b) by 323 days.

(21) Appl. No.: 12/686,697

(22) Filed: Jan. 13, 2010

(65) Prior Publication Data

US 2010/0186864 A1    Jul. 29, 2010

Related U.S. Application Data

(60) Provisional application No. 61/147,289, filed on Jan. 26, 2009, provisional application No. 61/154,489, filed on Feb. 23, 2009.

(51) Int. Cl.
*B60B 21/02*    (2006.01)

(52) U.S. Cl.
USPC ..................... 152/381.4; 152/381.6

(58) Field of Classification Search
USPC ........................... 152/381.4–381.6
See application file for complete search history.

(56) References Cited

U.S. PATENT DOCUMENTS

| | | | |
|---|---|---|---|
| 3,023,192 A | 2/1962 | Shivers, Jr. | |
| 3,651,014 A | 3/1972 | Witsiepe | |
| 3,763,109 A | 10/1973 | Witsiepe | |
| 3,766,146 A | 10/1973 | Witsiepe | |
| 4,502,521 A * | 3/1985 | Tavazza et al. | 152/381.4 |
| 5,060,706 A * | 10/1991 | Jones et al. | 152/381.5 |
| 6,318,428 B1 * | 11/2001 | Lo | 152/381.4 |
| 6,474,385 B1 * | 11/2002 | Bonning et al. | 152/381.4 |
| 7,445,034 B1 * | 11/2008 | Huang | 152/381.5 |
| 2005/0210675 A1 * | 9/2005 | Price et al. | 29/894.31 |
| 2006/0108041 A1 * | 5/2006 | Schelhaas | 152/381.6 |

FOREIGN PATENT DOCUMENTS

WO    WO2007/045086    4/2007

* cited by examiner

*Primary Examiner* — Jason Bellinger

(57) ABSTRACT

An elastomeric tire sealing ring for installation against a rim of a wheel to provide a sealing surface with a tire bead of a tire when a tire is installed on the wheel over the sealing ring, the sealing ring comprising a thermoplastic composition wherein the thermoplastic composition has a durometer reading of between 36 and 50 on the Shore D scale as per ISO 868; and a tensile strength of 7.0 MPa to 8.9 MPa at 10% elongation as determined with ISO 527 method.

5 Claims, 2 Drawing Sheets

ELASTOMER TIRE SEALING RING

The present invention relates to tire seal compositions and tire sealing rings that enable easy installation onto wheels or rims and effective seal between tires mounted on the wheels or rims.

BACKGROUND OF INVENTION

Patent application WO 2007/045086 A1 discloses a sealing system for tires which provides a seal between tubeless tires and the rims of the wheels upon which they are mounted. The system discloses the use of a vinyl polymer having a specific durometer reading of 50-75 on the A Shore hardness scale and a specific range of thickness from about 0.5-1 mm. Needed are elastomeric tire sealing rings that provide easy installation characteristics; can be readily manufactured using blow-molding methods; are capable of installation on a wide variety of rims having different rim profiles, and without the need trimming access material; and are capable of accommodating a wide variety of tire profiles.

SUMMARY OF INVENTION

One aspect of the invention is an elastomeric tire sealing ring for installation against a rim of a wheel to provide a sealing surface with a tire bead of a tire when a tire is installed on the wheel over the sealing ring, the sealing ring comprising a thermoplastic elastomer and having a cross-sectional contour that is conformable to the outer surfaces of the rim when exposed to air pressure when the tire is inflated over the wheel; wherein the thermoplastic elastomer has a durometer reading of between 36 and 50 on the Shore D scale as per ISO 868; and a tensile strength of 7.0 MPa to 8.9 MPa at 10% elongation as determined with ISO 527 method.

DETAILED DESCRIPTION OF INVENTION

Figure 1:
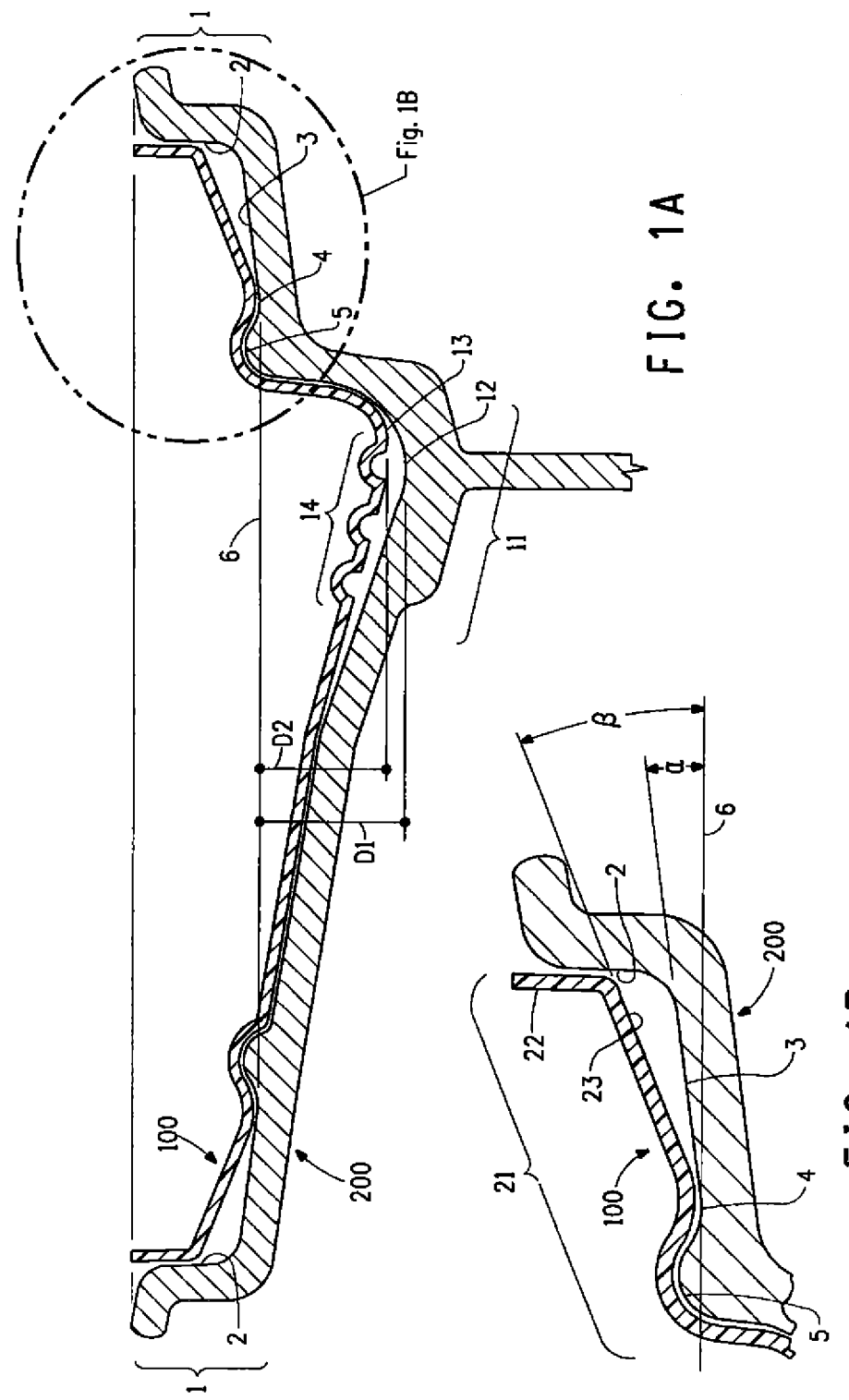
FIGS. 1A and 1B illustrate cross sectional views of a wheel rim and tire sealing ring with three rim drops.

The thermoplastic elastomers useful in the present invention are one or more copolyetherester elastomers that have a multiplicity of recurring long-chain ester units and short-chain ester units joined head-to-tail through ester linkages, said long-chain ester units being represented by formula (I):

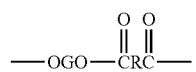

and said short-chain ester units being represented by formula (II):

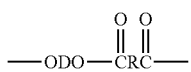

wherein
G is a divalent radical remaining after the removal of terminal hydroxyl groups from poly(alkylene oxide)glycols having a number average molecular weight of between about 400 and about 6000, or preferably between about 400 and about 3000;
R is a divalent radical remaining after removal of carboxyl groups from a dicarboxylic acid having a molecular weight of less than about 300;
D is a divalent radical remaining after removal of hydroxyl groups from a diol having a molecular weight less than about 250;
wherein said copolyetherester(s) preferably contain from about 15 to about 99 weight percent short-chain ester units and about 1 to about 85 weight percent long-chain ester units, or wherein the copolyetherester(s) more preferably contain from about 25 to about 90 weight percent short-chain ester units and about 10 to about 75 weight percent long-chain ester units As used herein, the term "long-chain ester units" as applied to units in a polymer chain refers to the reaction product of a long-chain glycol with a dicarboxylic acid. Suitable long-chain glycols are poly(alkylene oxide)glycols having terminal (or as nearly terminal as possible) hydroxy groups and having a number average molecular weight of from about 400 to about 6000, and preferably from about 600 to about 3000. Preferred poly(alkylene oxide)glycols include poly(tetramethylene oxide)glycol, poly(trimethylene oxide)glycol, poly(propylene oxide)glycol, poly(ethylene oxide)glycol, copolymer glycols of these alkylene oxides, and block copolymers such as ethylene oxide-capped poly(propylene oxide)glycol. Mixtures of two or more of these glycols can be used.

The term "short-chain ester units" as applied to units in a polymer chain of the copolyetheresters refers to low molecular weight compounds or polymer chain units having molecular weights less than about 550. They are made by reacting a low molecular weight diol or a mixture of diols (molecular weight below about 250) with a dicarboxylic acid to form ester units represented by Formula (II) above.

Included among the low molecular weight diols that react to form short-chain ester units suitable for use for preparing copolyetheresters are acyclic, alicyclic and aromatic dihydroxy compounds. Preferred compounds are diols with about 2-15 carbon atoms such as ethylene, propylene, isobutylene, tetramethylene, 1,4-pentamethylene, 2,2-dimethyltrimethylene, hexamethylene and decamethylene glycols, dihydroxycyclohexane, cyclohexane dimethanol, resorcinol, hydroquinone, 1,5-dihydroxynaphthalene, etc. Especially preferred diols are aliphatic diols containing 2-8 carbon atoms, and a more preferred diol is 1,4-butanediol. Included among the bisphenols which can be used are bis(p-hydroxy) diphenyl, bis(p-hydroxyphenyl)methane, and bis(p-hydroxyphenyl)propane. Equivalent ester-forming derivatives of diols are also useful (e.g., ethylene oxide or ethylene carbonate can be used in place of ethylene glycol or resorcinol diacetate can be used in place of resorcinol). As used herein, the term "diols" includes equivalent ester-forming derivatives such as those mentioned. However, any molecular weight requirements refer to the corresponding diols, not their derivatives.

Dicarboxylic acids that can react with the foregoing long-chain glycols and low molecular weight diols to produce the copolyetheresters are aliphatic, cycloaliphatic or aromatic dicarboxylic acids of a low molecular weight, i.e., having a molecular weight of less than about 300. The term "dicarboxylic acids" as used herein includes functional equivalents of dicarboxylic acids that have two carboxyl functional groups that perform substantially like dicarboxylic acids in reaction with glycols and diols in forming copolyetherester polymers. These equivalents include esters and ester-forming derivatives such as acid halides and anhydrides. The molecular weight requirement pertains to the acid and not to its equivalent ester or ester-forming derivative. Thus, an ester of a dicarboxylic acid having a molecular weight greater than 300 or a functional equivalent of a dicarboxylic acid having a molecular weight greater than 300 are included provided the corresponding acid has a molecular weight below about 300. The dicarboxylic acids can contain any substituent groups or combinations that do not substantially interfere with the copolyetherester polymer formation and use of the polymer in the compositions of this invention.

The term "aliphatic dicarboxylic acids," as used herein, refers to carboxylic acids having two carboxyl groups each attached to a saturated carbon atom. If the carbon atom to which the carboxyl group is attached is saturated and is in a ring, the acid is cycloaliphatic. Aliphatic or cycloaliphatic acids having conjugated unsaturation often cannot be used because of homopolymerization. However, some unsaturated acids, such as maleic acid, can be used.

Aromatic dicarboxylic acids, as the term is used herein, are dicarboxylic acids having two carboxyl groups each attached to a carbon atom in a carbocyclic aromatic ring structure. It is not necessary that both functional carboxyl groups be attached to the same aromatic ring and where more than one ring is present, they can be joined by aliphatic or aromatic divalent radicals or divalent radicals such as —O— or —SO$_2$—.

Representative useful aliphatic and cycloaliphatic acids that can be used include sebacic acid; 1,3-cyclohexane dicarboxylic acid; 1,4-cyclohexane dicarboxylic acid; adipic acid; glutaric acid; 4-cyclohexane-1,2-dicarboxylic acid; 2-ethyl-suberic acid; cyclopentanedicarboxylic acid decahydro-1,5-naphthylene dicarboxylic acid; 4,4'-bicyclohexyl dicarboxylic acid; decahydro-2,6-naphthylene dicarboxylic acid; 4,4'-methylenebis(cyclohexyl)carboxylic acid; and 3,4-furan dicarboxylic acid. Preferred acids are cyclohexane-dicarboxylic acids and adipic acid.

Representative aromatic dicarboxylic acids include phthalic, terephthalic and isophthalic acids; bibenzoic acid; substituted dicarboxy compounds with two benzene nuclei such as bis(p-carboxyphenyl)methane; p-oxy-1,5-naphthalene dicarboxylic acid; 2,6-naphthalene dicarboxylic acid; 2,7-naphthalene dicarboxylic acid; 4,4'-sulfonyl dibenzoic acid and $C_1$-$C_{12}$ alkyl and ring substitution derivatives thereof, such as halo, alkoxy, and aryl derivatives. Hydroxyl acids such as p-(beta-hydroxyethoxy)benzoic acid can also be used provided an aromatic dicarboxylic acid is also used.

Aromatic dicarboxylic acids are a preferred class for preparing the copolyetherester polymers useful for this invention. Among the aromatic acids, those with 8-16 carbon atoms are preferred, particularly terephthalic acid alone or with a mixture of phthalic and/or isophthalic acids.

The copolyetheresters preferably comprise about 15 to about 99 weight percent short-chain ester units corresponding to Formula (II) above, the remainder being long-chain ester units corresponding to Formula (I) above. The copolyetheresters more preferably comprise about 20 to about 95 weight percent, and even more preferably about 25 to about 60 weight percent short-chain ester units, where the remainder is long-chain ester units. More preferably, at least about 70% of the groups represented by R in Formulae (I) and (II) above are 1,4-phenylene radicals and at least about 70% of the groups represented by D in Formula (II) above are 1,4-butylene radicals and the sum of the percentages of R groups which are not 1,4-phenylene radicals and D groups that are not 1,4-butylene radicals does not exceed 30%. If a second dicarboxylic acid is used to make the copolyetherester, isophthalic acid is preferred and if a second low molecular weight diol is used, 1,4-butenediol or hexamethylene glycol are preferred.

A blend or mixture of two or more copolyetherester elastomers can be used. The copolyetherester elastomers used in the blend need not on an individual basis come within the values disclosed hereinbefore for the elastomers. However, the blend of two or more copolyetherester elastomers must conform to the values described herein for the copolyetheresters on a weighted average basis. For example, in a mixture that contains equal amounts of two copolyetherester elastomers, one copolyetherester can contain 60 weight percent short-chain ester units and the other copolyetherester can contain 30 weight percent short-chain ester units for a weighted average of 45 weight percent short-chain ester units.

Preferably, the copolyetherester elastomers are prepared from esters or mixtures of esters of terephthalic acid and isophthalic acid, 1,4-butanediol and poly(tetramethylene ether)glycol or ethylene oxide-capped polypropylene oxide glycol, or are prepared from esters of terephthalic acid, e.g. dimethylterephthalate, 1,4-butanediol and poly(ethylene oxide)glycol. More preferably, the copolyetherester elastomers are prepared from esters of terephthalic acid, e.g. dimethylterephthalate, 1,4-butanediol and poly(tetramethylene ether)glycol.

The copolyetherester elastomers described herein can be made conveniently by methods known to those skilled in the art, such as by using a conventional ester interchange reaction. A preferred procedure involves heating the ester of an aromatic acid, e.g., dimethyl ester of terephthalic acid, with the poly(alkylene oxide)glycol and a molar excess of the low molecular weight dial, 1,4-butanediol, in the presence of a catalyst, followed by distilling off methanol formed by the interchange reaction. Heating is continued until methanol evolution is complete. Depending on temperature, catalyst and glycol excess, this polymerization is complete within a few minutes to a few hours. This product results in the preparation of a low molecular weight prepolymer which can be carried to a high molecular weight copolyetherester by the procedure described below. Such prepolymers can also be prepared by a number of alternate esterification or ester interchange processes; for example, the long-chain glycol can be reacted with a high or low molecular weight short-chain ester homopolymer or copolymer in the presence of catalyst until randomization occurs. The short-chain ester homopolymer or copolymer can be prepared by ester interchange from either the dimethyl esters and low molecular weight diols as above, or from the free acids with the diol acetates. Alternatively, the short-chain ester copolymer can be prepared by direct esterification from appropriate acids, anhydrides or acid chlorides, for example, with diols or by other processes such as reaction of the acids with cyclic ethers or carbonates. Obviously, the prepolymer might also be prepared by running these processes in the presence of the long-chain glycol.

The resulting prepolymer is then carried to high molecular weight by distillation of the excess of short-chain diol. This process is known as "polycondensation". Additional ester interchange occurs during this distillation to increase the molecular weight and to randomize the arrangement of the copolyetherester units. Best results are usually obtained if this final distillation or polycondensation is run at less than 1 mm pressure and 240-260° C. for less than 2 hours in the presence of antioxidants such as 1,6-bis-[3,5-di-tert-butyl-4-hydroxyphenol)propionamido]-hexane or 1,3,5-trimethyl-2,4,6-tris [3,5-di-tert-butyl-4-hydroxybenzyl]benzene. Most practical polymerization techniques rely upon ester interchange to complete the polymerization reaction. In order to avoid excessive hold time at high temperatures with possible irreversible thermal degradation, it may be advantageous to employ a catalyst for ester interchange reactions. While a wide variety of catalysts can be used, organic titanates such as tetrabutyl titanate used alone or in combination with magnesium or calcium acetates are preferred. Complex titanates, such as derived from alkali or alkaline earth metal alkoxides and titanate esters are also very effective. Inorganic titanates, such as lanthanum titanate, calcium acetate/antimony trioxide mixtures, and lithium and magnesium alkoxides are representative of other catalysts that can be used. Also preferred are stannous catalysts.

The one or more CPEE's useful in forming tire sealing rings have a durometer reading of between 36 and 50 on the Shore D scale as per ISO 868; and a tensile strength of 7.0 MPa to 8.9 MPa at 10% elongation as determined with ISO 527 method.

The one or more CPEE's useful in forming tire sealing rings have melting points of about 170° C. to about 210° C., or preferably of about 190° C. to about 210° C. Melting points are measured according to ISO 11357-1/3:1997(E) at a rate of 10° C./minute.

The one or more CPEE's useful in forming tire sealing rings have Vicat softening temperatures of at least about 100° C., and preferably about 140 to 165° C. Vicat softening temperatures are measured according to ISO 306:2004(E) at 10 N and 50° C./h.

One embodiment is a tire sealing ring wherein the thermoplastic elastomer has a melt temperature of 190 to 210° C., as determined with ISO Method 11357-1/-3. Another embodiment is a tire sealing ring wherein the thermoplastic elastomer has a melt flow index as measured with ISO method 1133 (230° C., 2.16 Kg) of 0.6 to bout 2.7.

The chemical structure of copolyetheresters (CPEE) is similar to polyesters in that they have ester linkages. An example is Hytrel®, available from Du Pont Company, Wilmington, Del., the structure of which is shown below.

etherester by distillation of the excess of short-chain diol. The second process stage is known as "polycondensation".

Additional ester interchange occurs during this polycondensation which serves to increase the molecular weight and to randomize the arrangement of the copolyetherester units. Best results are usually obtained if this final distillation or polycondensation is run at less than about 670 Pa, preferably less than about 250 Pa, and about 200° C.-280° C., preferably about 220° C. 260° C., for less than about two hours, e.g., about 0.5 to 1.5 hours. It is customary to employ a catalyst while carrying out ester interchange reactions. While a wide variety of catalysts can be employed, organic titanates such as tetrabutyl titanate used alone or in combination with magnesium or calcium acetates are preferred. The catalyst should be present in the amount of about 0.005 to 2.0 percent by weight based on total reactants.

Both batch and continuous methods can be used for any stage of copolyetherester polymer preparation. Polycondensation of prepolymer can also be accomplished in the solid phase by heating divided solid prepolymer in a vacuum or in a stream of inert gas to remove liberated low molecular weight diol. This method has the advantage of reducing thermal degradation because it must be used at temperatures below the softening point of the prepolymer.

A detailed description of suitable copolyetherester elastomers that can be used in the invention and procedures for their preparation are described in U.S. Pat. Nos. 3,023,192, 3,651,014, 3,763,109, and 3,766,146, the disclosures of which are incorporated herein by reference. Typical copolyether esters are for example those made and marketed by Du Pont (Wilmington, Del.) under the name Hytrel® elastomers.

In one embodiment the tire sealing rings have an average thickness of about 0.3 to 0.8 mm, preferably 0.3 to 0.7 mm and more preferably about 0.4 to about 0.5 mm. The average thickness is calculated by determining the maximum thickness and minimum thickness of the ring by measurement using a dial caliper at several different locations around the ring; using the following equation maximum thickness+minimum thickness/2=average thickness

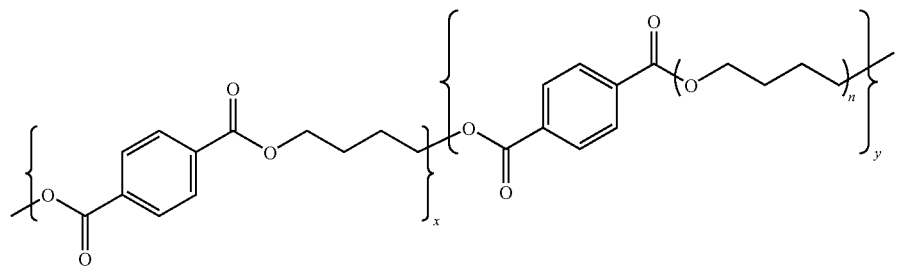

The copolyetheresters described herein are made by a conventional ester interchange reaction. A preferred procedure involves heating the dimethyl ester of terephthalic acid with a long-chain glycol and a molar excess of 1,4-butanediol in the presence of a catalyst at about 150° C.-260° C. and a pressure of 0.05 to 0.5 MPa, usually ambient pressure, while distilling off methanol formed by the ester interchange. Depending on temperature, catalyst, glycol excess and equipment, this reaction can be completed within a few minutes, e.g., about two minutes, to a few hours, e.g., about two hours. This procedure results in the preparation of a low molecular weight prepolymer which can be carried to a high molecular weight copoly- The average thickness of the tire sealing ring has a significant impact on the tire inflation pressure required to set the bead of the tire. The "bead" is a round hoop of steel wires, wrapped or reinforced by ply cords, shaped to fit the rim of a wheel. The bead is embedded in the tire. When the sealing ring is installed onto the rim of the wheel, the overall rim radius is effectively increased. Due to the larger radius, the resistance between the tire and the sealing ring is increased over that of the tire and rim alone. Thus, typically higher air pressure is required to properly inflate the tire, and set the bead of the tire onto the sealing ring than that required using the rim alone. Sealing rings installed onto the rim with an average wall thickness exceeding 0.6 mm often required the tire to be inflated multiple times before the tire would properly inflate. Tire sealing rings with an average wall thickness exceeding 1 mm failed to inflate within the maximum inflation pressure indicated by the tire manufacturer. Tire sealing rings with an average thickness of 0.4 to 0.5 mm are preferred thickness for user friendly installation. In this range, the sealing rings exhibited good tear resistance and maintained their original shape during and post installation. Tire sealing rings of less than 0.3 mm in average thickness exhibited tearing during installation onto the rim and loss their original shape, which required the installer to further manipulate the sealing ring into position on the rim. Tire sealing rings with thicknesses greater than 0.7 mm were typically more difficult to stretch over the rim.

As illustrated in FIG. 1A, a rim of a wheel for automobiles typically has three or more rim drops. A rim drop is a drop in the diameter of the rim from the maximum diameter at the outer edge of rim. Typically there are at least three rim drops, two equal outer rim drops (1) situated on either edge of the rim serve to create a vertical surface plane (2) used in seating the tire bead. The vertical surface plane (2) is perpendicular to the rotational axis of the wheel. The third inner rim drop (11) serves to drop the diameter of the wheel to meet the wheel mounts.

FIG. 1A further illustrates a cross-sectional view of the rim of a wheel and one embodiment of a tire sealing ring (100) mounted on a rim (200) of a wheel; positioned such that the rotational axis of the wheel is parallel to the ground. A preferred embodiment of the invention is a tire sealing ring (100) wherein the rim (200) has three or more rim drops; two outer rim drops (1) having equal cross-sectional contours and an inner rim drop (11), said outer rim drop having in connecting-sequence from the outer edge of the rim, a rim vertical surface plane (2) used in seating the tire bead, an outer drop bottom having an angled surface line (3), and a bulb (5); wherein said outer drop bottom has a drop bottom minimum (4) wherein said drop bottom minimum defines the intersection of a outer rim drop bottom tangent line (6) that also is parallel to the rotational axis of the wheel; wherein the intersection of the angled surface line (3) and the outer rim drop bottom tangent line (6) defines an rim outer drop bottom angle α (alpha) (FIG. 1B); and said tire sealing ring (100) has at least three sealing ring drops, at least two outer sealing ring drops and an inner sealing ring drop; at least one of said outer sealing ring drops (21) having in connecting sequence a sealing ring seating surface (22) used in seating the tire bead; a sealing ring outer drop bottom having a surface line (23); said surface line (23) intersecting with the outer rim drop bottom tangent line (6) and defining an angle Beta (FIG. 1B); wherein said angle Beta is 1.5 to 4 times larger than angle Alpha, and preferably 2 to 3 times larger than angle Alpha; and wherein the inner rim drop (11) has an inner rim drop bottom minimum (12) positioned at a depth D1 from said outer rim drop bottom tangent line (6); and said inner sealing ring drop has a inner sealing ring bottom minimum (13) positioned at a depth D2 from the outer rim drop bottom tangent line (6); wherein the ratio of D2:D1 is 0.2 to 0.95 and preferably 0.5 to 0.9, and more preferably 0.6 to 0.8.

The protrusion (5) is defined by a bulb protrusion radius (not shown in FIG. 1) that is intersected by the outer rim drop bottom tangent line (6); and in one embodiment said sealing ring outer drop bottom surface line (23) intersects the outer rim drop bottom tangent line (6) at the protrusion radius.

The sealing ring seating surface (22) refers to a surface that may be (a) perpendicular to the rotational axis of the wheel; (b) tilted toward the outer edge of the rim from 0.1 to 90-Beta degrees, and preferably, about 5 to 60 degrees from the perpendicular alignment with the rotational axis, toward the outer edge of the rim; or (c) a convex surface. The sealing ring seating surface contacts the tire bead upon installation of the tire.

In a preferred embodiment the tire sealing ring has two outer sealing ring drops that are identical in cross-sectional contours.

Another preferred embodiment of the tire sealing ring has one or more undulations (14) in said inner sealing ring drop that can act as stretch zones for easy installation of the sealing ring (100) onto the rim. When the tire is inflated; these stretch zones are compressed to substantially contact the rim. The undulations, if present, are preferably 4 mm to 5 mm deep and about 8 mm wide.

Before inflation, the sealing ring seating surface (22) may fully or partially contact the rim vertical surface plane (2). After tire inflation, the gaps between the tire sealing ring (100) and the rim are substantially reduced, such that the tire sealing ring contacts and seals the rim along the entire surface of the tire sealing ring (100).

Figure 2:
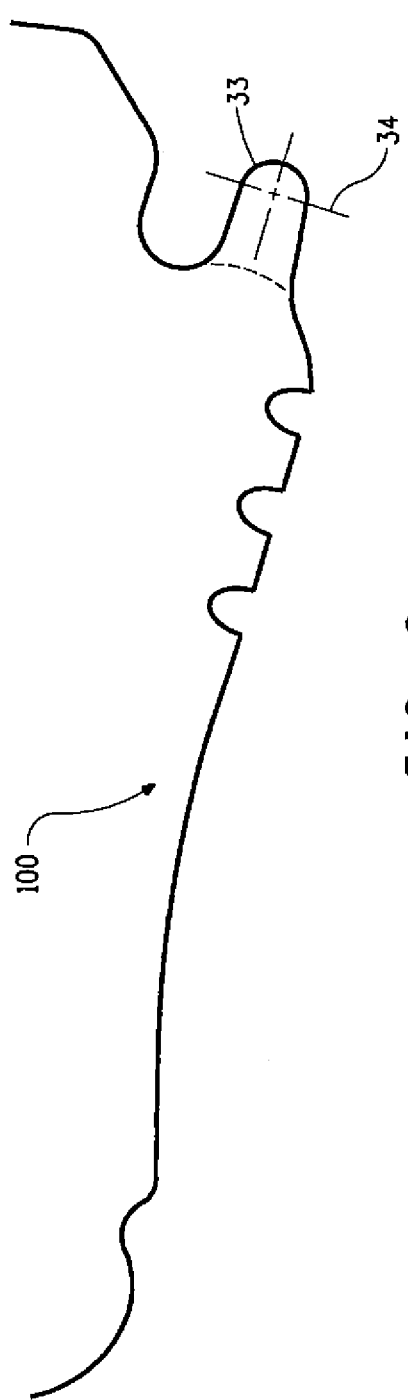
FIG. 2 illustrates one embodiment of a cross sectional view of a tire sealing ring (100) having a valve stem dimple (33).

In another embodiment of the invention, the tire sealing ring has an integrally formed projecting valve stem dimple (33) that can be used in forming a valve stem sleeve. FIG. 2 illustrates a cross sectional view of a tire sealing ring (100) at the position of the valve stem dimple (33). During installation onto the rim, the dimple is aligned with the hole in the rim used to accommodate the tire valve stem and trimmed at the trim line (34) with a cutting tool. The trimming provides a functional valve stem sleeve for the valve stem. The valve stem dimple is preferably positioned at, or within about 20 mm, of the inner sealing ring bottom minimum (13).

Methods

Blow-Molding of Tire Sealing Rings

The elastomeric tire sealing rings were made by blow-molding the resins listed in the examples into a blow-molding (B-M) tool having the configuration of a standard 15 inch (38 cm rim). The resin (was preconditioned at 110° C. for 4-6 h and loaded into the back-end of a 80 mm single screw extruder Sterling Monolayer Blow Molder with 50# head capacity and heated to 230-240° C. range to provide a homogenous melt. The melt was extruded through a 9" diverging head die to provide an approximately 0.8 mm thick 9-10 inch (23-25 cm) diameter parison between both halves of a vertically opened tooling by gravity until it reached below the lower end of the B-M tool. The B-M tool halves were closed pinching the parison at top and bottom of B-M tool, and inflating the parison within the closed B-M tool, thereby thinning the parison wall to approximately 0.5 mm thickness onto the 15" tire rim's major diameter. The inflated parison was held for an appropriate time until the resin crystallized.

Tire Sealing Ring and Tire Mounting

The tire sealing ring was mounted using a conventional tire installation machine to assist. A conventional aqueous surfactant lubricant (Bead Lub, Rema Tiptop, N.J.) was first applied to the inside surface of the sealing ring. Half the sealing ring was mounted and held onto the drop center (waist) of the wheel, and incrementally the remainder of the sealing ring was pushed over the wheel. The mounted sealing ring was then perforated at the valve stem hole of the wheel and valve stem inserted through the sealing ring. The surface of the mounted sealing ring and tire beads were lubricated and the tire mounted as with conventional tire mounting. The tire was inflated to set the tire beads on the surface of the sealing ring using no more than the manufacturers maximum recommended tire pressure. If the manufacturers maximum recommended tire pressure failed to set the tire bead, the tire was deflated, additional lubricant applied and the process repeated.

Example 1

Tire sealing rings (1a-1k) were prepared using Hytrel® 8136 BK elastomer resin; having a durometer hardness, Shore D maximum (ISO 868) of 49, and a tensile stress at 10% elongation (ISO 527 method) of 7.9 MPa; processed at 230° C. with a moisture content of less than 0.03%, provided by E.I. du Pont de Nemours & Co., Inc. (Wilmington, Del., USA).

Example 2

Tire sealing rings (2a-2d) were prepared using Hytrel® 5612 BK320 elastomer resin; having a durometer hardness, Shore D maximum (ISO 868) of 50, a tensile stress at 10% elongation (ISO 527 method) of 8.9 MPa; processed at a melt temperature of 240° C., provided by E.I. du Pont de Nemours & Co., Inc. (Wilmington, Del., USA). The resin was dried to less than 0.03% moisture content.

Example 3

Tire sealing rings (3a-3i) were prepared using Hytrel® 8341 G BK320 elastomer resin; having a durometer hardness, Shore D maximum (ISO 868) of 40, and a tensile stress at 10% elongation (ISO 527 method) of 7.0 MPa; provided by E.I. du Pont de Nemours & Co., Inc. (Wilmington, Del., USA).

Table 1 shows the mounting conditions for the tire sealing rings of Examples 1-3.

TABLE 1

Tire Sealing Ring Tire Mounting Conditions

| Trial No. | Example | Max. Ring thickness (mm) | Min. Ring thickness (mm) | Average Ring thickness (mm) | Bead setting Pressure (psi) |
|---|---|---|---|---|---|
| 3 | 1a | 0.67 | 0.39 | 0.53 | 0.14 |
| 4 | 1b | 0.62 | 0.24 | 0.43 | 0.12 |
| 4 | 1c | 0.62 | 0.24 | 0.43 | 0.12 |
| 6 | 1d | 0.76 | 0.31 | 0.535 | 0.22 |
| 7 | 1e | 0.72 | 0.35 | 0.535 | 0.23 |
| 8 | 1f | 0.62 | 0.36 | 0.49 | 0.18 |
| 10 | 1g | 0.59 | 0.23 | 0.41 | 0.13 |
| 21 | 1h | 0.56 | 0.35 | 0.455 | 0.16 |
| 22 | 1i | 0.56 | 0.35 | 0.455 | 0.19 |
| 23 | 1j | 0.56 | 0.35 | 0.455 | 0.18 |
| 24 | 1k | 0.56 | 0.35 | 0.455 | 0.26 |
| 2 | 2a | 0.85 | 0.5 | 0.675 | 0.23 |
| 5 | 2b | 0.79 | 0.43 | 0.61 | 0.24 |
| 9 | 2c | 1.19 | 0.45 | 0.82 | 0.44 |
| 11 | 2d | 0.8 | 0.55 | 0.675 | 0.16 |
| 12 | 3a | 0.76 | 0.36 | 0.56 | 0.26 |
| 13 | 3b | 1 | 0.52 | 0.76 | 0.33 |
| 14 | 3c | 0.71 | 0.33 | 0.52 | 0.23 |
| 15 | 3d | 0.71 | 0.33 | 0.52 | 0.28 |
| 16 | 3e | 0.71 | 0.33 | 0.52 | 0.25 |
| 17 | 3f | 0.71 | 0.33 | 0.52 | 0.28 |
| 18 | 3g | 0.71 | 0.33 | 0.52 | 0.34 |
| 19 | 3h | 0.85 | 0.34 | 0.595 | 0.39 |
| 20 | 3i | 0.85 | 0.34 | 0.595 | 0.34 |

The invention claimed is:

1. An elastomeric tire sealing ring for installation against a rim of a wheel to provide a sealing surface with a tire bead of a tire when a tire is installed on the wheel over the sealing ring, the sealing ring comprising a thermoplastic elastomer and having a cross-sectional contour that is conformable to the outer surfaces of the rim when exposed to air pressure when the tire is inflated over the wheel;
    wherein the thermoplastic elastomer has a durometer reading of between 36 and 50 on the Shore D scale as per ISO 868; and a tensile strength of 7.0 MPa to 8.9 MPa at 10% elongation as determined with ISO 527 method;
    wherein the average wall thickness of the sealing ring before installation is in the range of 0.3 mm to 0.7 mm;
    wherein the thermoplastic elastomer has a melt temperature of 190 to 210° C., as determined with ISO Method 11357-1/-3;
    wherein the rim has three or more rim drops; two outer rim drops having equal cross-sectional contours and an inner rim drop, said outer rim drops having in connecting-sequence from the outer edge of the rim: a rim vertical surface plane used in seating the tire bead, an outer drop bottom having an angled surface line, and a protrusion;
    wherein said outer drop bottom has a drop bottom minimum wherein said drop bottom minimum defines the intersection of an outer rim drop bottom tangent line that also is parallel to the rotational axis of the wheel;
    wherein the intersection of the angled surface line and the outer rim drop bottom tangent line defines an rim outer drop bottom angle (Alpha); and said tire sealing ring has at least three sealing ring drops, at least two outer sealing ring drops and an inner sealing ring drop; at least one of said outer sealing ring drops having in connecting sequence: a sealing ring seating surface used in seating the tire bead; a sealing ring outer drop bottom having a surface line; said surface line intersecting with the outer rim drop bottom tangent line and defining an angle (Beta); wherein said angle (Beta) is 1.5 to 4 times larger than angle (Alpha), and
    wherein the inner rim drop has an inner rim drop bottom minimum positioned at a depth D1 from said outer rim drop bottom tangent line; and said inner sealing ring drop has a inner sealing ring bottom minimum positioned at a depth D2 from the outer rim drop bottom tangent line;
    wherein the ratio of D2:D1 is 0.2 to 0.95.

2. The tire sealing ring of claim 1, wherein said angle (Beta) is 2 to 3 times larger than angle (Alpha) and wherein the ratio of D2:D1 is 0.5 to 0.9.

3. The tire sealing ring of claim 2, wherein said inner sealing ring drop has one or more undulations.

4. The tire sealing ring of claim 2, having an integrally formed projecting valve stem dimple.

5. The elastomeric tire sealing ring of claim 1, wherein said elastomers is a copolyetherester.

* * * * *